(12) United States Patent
Jaasund (10) Patent No.: US 10,890,113 B2
(45) Date of Patent: Jan. 12, 2021

(54) SYSTEM, APPARATUSES, AND METHODS FOR IMPROVING THE OPERATION OF A TURBINE BY USING ELECTROSTATIC PRECIPITATION

(71) Applicant: AIRTECH INNOVATIONS, LLC, Federal Way, WA (US)

(72) Inventor: Steven A. Jaasund, Federal Way, WA (US)

(73) Assignee: AIRTECH INNOVATIONS, LLC, Federal Way, WA (US)

( * ) Notice: Subject to any disclaimer, the term of this patent is extended or adjusted under 35 U.S.C. 154(b) by 915 days.

(21) Appl. No.: 15/366,275

(22) Filed: Dec. 1, 2016

(65) Prior Publication Data

US 2017/0157622 A1 Jun. 8, 2017

Related U.S. Application Data

(60) Provisional application No. 62/261,987, filed on Dec. 2, 2015.

(51) Int. Cl.
*F02C 7/055* (2006.01)
*F02C 7/08* (2006.01)
*F02C 6/18* (2006.01)

(52) U.S. Cl.
CPC ............... *F02C 7/055* (2013.01); *F02C 7/08* (2013.01); *F02C 6/18* (2013.01)

(58) Field of Classification Search
CPC .. F02C 7/05; F02C 7/052; F02C 7/055; F02C 7/08; F02C 6/18; B03C 3/017; B03C 3/16;
(Continued)

(56) References Cited

U.S. PATENT DOCUMENTS 1,414,079 A * 4/1922 Giebner ................. C10G 33/02
204/671
3,765,154 A 10/1973 Hardt et al.
(Continued)

FOREIGN PATENT DOCUMENTS

EP 1769851 A1 4/2007
WO WO1996/024760 A1 8/1996
(Continued)

OTHER PUBLICATIONS

International Searching Authority of the PCT; USPTO: Ntc of International Search Report & Written Opinion dated Feb. 16, 2017/; Int'l Appl. No. PCT/US16/64376; pp. 1-16.
(Continued)

*Primary Examiner* — William H Rodriguez
(74) *Attorney, Agent, or Firm* — FisherBroyles LLP (57) ABSTRACT

Embodiments of the invention involve the application of a disk-in-tube type of "wet" or "dry" ESP (electrostatic precipitation) technology for the capture/removal of airborne particles entering a gas turbine compressor. This provides an effective method of particulate removal without the inefficiencies associated with conventional filtering techniques. Embodiments of the innovative approach also eliminate the inlet airstream blocking effect of a conventional filter, thus making its use and operation adaptable to different operating environments and processes that require clean input air streams (including industrial manufacturing processes, power generators, combined turbine and fluid recapture systems for use in heating and cooling, etc.).

25 Claims, 6 Drawing Sheets

(58) Field of Classification Search
CPC .... B03C 3/41; B03C 3/45; B03C 3/49; B03C 3/78; B03C 2201/08; B03C 2201/10; F01K 25/065; F01K 23/10; F05D 2260/607; Y02T 50/675; Y02A 50/2355; Y02A 50/2357; B64D 2033/0246
See application file for complete search history.

(56) References Cited

U.S. PATENT DOCUMENTS

| | | | |
|---|---|---|---|
| 4,093,430 A | 6/1978 | Schwab et al. | |
| 4,110,086 A | 8/1978 | Schwab et al. | |
| 4,194,888 A | 3/1980 | Schwab et al. | |
| 6,527,829 B1 | 3/2003 | Malkamaki et al. | |
| 6,964,698 B1 * | 11/2005 | Davis | B03C 3/013 96/52 |
| 7,318,857 B2 | 1/2008 | Ray et al. | |
| 7,524,357 B2 | 4/2009 | Daukant | |
| 7,527,674 B1 | 5/2009 | Janawitz et al. | |
| 7,582,144 B2 | 9/2009 | Krigmont | |
| 7,695,551 B2 | 4/2010 | Janawitz et al. | |
| 7,776,141 B2 | 8/2010 | Wu et al. | |
| 8,038,776 B2 * | 10/2011 | Janawitz | B01D 46/0032 55/361 |
| 8,286,431 B2 | 10/2012 | Briesch et al. | |
| 8,337,600 B2 | 12/2012 | Paur et al. | |
| 8,424,283 B2 | 4/2013 | Chillar et al. | |
| 8,539,775 B1 | 9/2013 | Wong | |
| 9,199,248 B2 | 12/2015 | Au et al. | |
| 2009/0229468 A1 | 9/2009 | Janawitz et al. | |
| 2011/0011265 A1 * | 1/2011 | Paur | B03C 3/86 96/57 |
| 2015/0354461 A1 | 12/2015 | Meier et al. | |
| 2017/0068180 A1 * | 3/2017 | Hori | G03G 15/0291 |
| 2018/0200670 A1 * | 7/2018 | Ray | B03C 3/49 |
| 2018/0200671 A1 * | 7/2018 | Ray | B03C 3/41 |
| 2019/0189405 A1 * | 6/2019 | Lee | H01J 37/32073 |
| 2020/0212163 A1 * | 7/2020 | Lou | H01L 27/329 |

FOREIGN PATENT DOCUMENTS

| | | |
|---|---|---|
| WO | WO2003/002861 A1 | 1/2003 |
| WO | 2017096014 A1 | 6/2017 |

OTHER PUBLICATIONS

Marco Santini, Giorgio Marchetti, Fiorenzo Giuntini, Carment Suarex/ GE Oil & Gas; "Gas Turbine High Efficiency Filtration Systems," GE.com/oilandgas, 2012, pp. 1-15.

Melissa Wilcox et al., "Technology Review of Modern Gas Turbine Inlet Filtration Systems," International Journal of Rotating Machinery, vol. 2012 Article ID 128134, pp. 1-12.

* cited by examiner

Disk-in-Round Tube

*FIG. 4A*

Disk-in-Hex Tube

SYSTEM, APPARATUSES, AND METHODS FOR IMPROVING THE OPERATION OF A TURBINE BY USING ELECTROSTATIC PRECIPITATION

This application claims the benefit of U.S. Provisional Application No. 62/261,987, entitled "System, Apparatuses, and Methods for Improving Operation of Turbine by Removal of Particulate Matter from Airstream Using Electrostatic Precipitation," filed Dec. 2, 2015, the contents of which is incorporated by reference herein in its entirety (including the Appendix) for all purposes.

BACKGROUND

In an ideal gas turbine, gases undergo three thermodynamic processes: an isentropic compression, an isobaric (constant pressure) combustion, and an isentropic expansion. Together, these make up the Brayton cycle, an example of which is shown in FIG. 1(A). The thermodynamic process known as the Brayton cycle is analogous to the Carnot cycle, in which the efficiency is maximized by increasing the temperature difference of the working fluid between the input and output of the machine; in the Brayton cycle efficiency is maximized by increasing the pressure difference across the machine (i.e., between the intake and output flows).

Figure 1A:
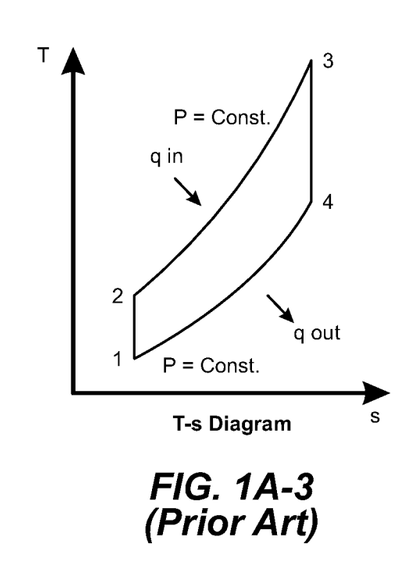
FIG. 1(A) is a diagram illustrating an example of the Brayton cycle, which may be used to explain aspects of the operation of certain turbine systems.
FIG. 1(B) is a diagram illustrating the inventive use of an ESP apparatus as part of a single cycle turbine system.
Figure 1A:
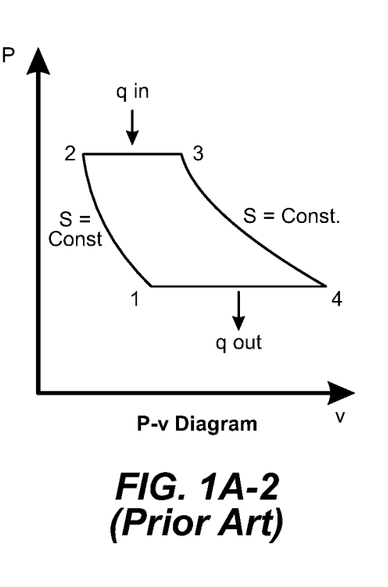
Figure 1A:
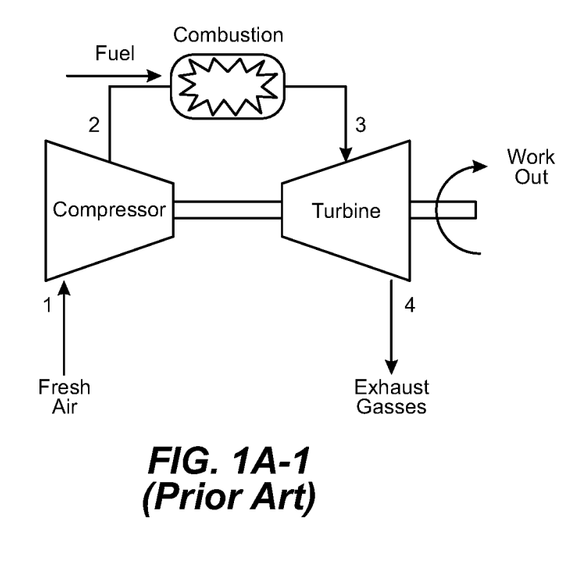

A typical gas turbine is comprised of three main components (as shown in FIG. 1(A)-1): a compressor, a combustor, and a turbine. The working fluid or flow, air, is compressed in the compressor (by a process of adiabatic compression—that is with no heat gains or loss), then mixed with fuel and burned by the combustor under constant pressure conditions in the combustion chamber (i.e., a condition of constant pressure with the addition of heat, as shown in FIG. 1(A)-2). The resulting hotter gas expands through the turbine to perform work (via a process of adiabatic expansion), as shown in FIG. 1(A)-3). Much of the power produced in the turbine is used to run the compressor and the rest is available to run auxiliary equipment and to do useful work. The system shown is an "open" system because the air is not reused, so that the fourth step in the Brayton cycle, cooling the working fluid, is omitted.

In a practical gas turbine system, mechanical energy is irreversibly transformed into heat when the gas or gases are compressed (in either a centrifugal or axial compressor), due to internal friction and turbulence. Passage through the combustion chamber, where heat is added and the specific volume of the gases increases, is accompanied by a slight loss in pressure. During expansion amidst the stator and rotor blades of the turbine, irreversible energy transformation once again occurs.

If the device has been designed to power a shaft, as with an industrial generator or a turboprop, the exit pressure of the gas or gases will be as close to the entry pressure as possible. However, in practice, it is necessary that some pressure remains at the outlet in order to fully expel the exhaust gases. In the case of a jet engine, only enough pressure and energy is extracted from the flow to drive the compressor and other components. The remaining high pressure gases are accelerated to provide a jet exhaust flow that can, for example, be used to propel an aircraft.

As noted, gas turbine engines derive their power from burning fuel in a combustion chamber and using the fast-flowing combustion gases to drive a turbine, in much the same way as high pressure steam is used to drive a steam turbine. One difference, however, is that the gas turbine has a second turbine acting as an air compressor mounted on the same shaft. The air turbine (compressor) draws in air, compresses it and feeds it at high pressure into the combustion chamber, thereby increasing the intensity of the combustion process. Note that this forms a positive feedback mechanism; as the gas turbine speeds up, it also causes the compressor to speed up, thereby forcing more air through the combustion chamber. This in turn increases the burn rate of the fuel, sending more high pressure hot gases into the gas turbine and increasing its speed even more. An uncontrolled runaway effect is prevented by controls on the fuel supply line which limit the amount of fuel fed to the turbine, thus limiting its speed.

In electricity generating applications, a turbine is used to drive a synchronous generator which provides the electrical power output; because the turbine normally operates at very high rotational speeds of 12,000 rpm or more, typically it must be connected to the generator through a high ratio reduction gear since the generators run at speeds of 1,000 or 1,200 rpm, depending on the AC frequency of the electricity grid.

As described, turbine generators operate by using the compression, combustion, and expansion of gas to drive a rotor/fan for purposes of propulsion and/or generating electricity. Optimal operation requires that the airstream (i.e., the intake gases) being used to facilitate the combustion and that is subject to the compression and expansion be as free from particulate matter as possible in order to prevent damage to turbine blades and a less effective combustion process (note that this concern also applies to a turbine compressor). Conventionally, inlet airstream or intake airflow filtering has been accomplished using a physical trap or barrier for particulate matter, such as a fabric-based filter that is placed across part or all of the intake airstream. In this type of filter, particles are removed from the airstream by their intersection with a barrier through which the air can flow (or at least flow with no more than a slight impediment when the filter is relatively clean).

While this approach to removing particulate matter may be effective in some use cases, it introduces certain disadvantages and may not be optimal for some operational environments. These disadvantages include, but are not limited to (a) a reduction in the pressure difference between the intake and outflow, thereby negatively impacting turbine operational efficiency, (b) a reduction in the effectiveness of the airstream filtering and an increased pressure difference over time as a result of the accumulation of particulate matter, and (c) costs and turbine system downtime associated with the required periodic filter cleaning or replacement.

Generally, electrostatic precipitation (ESP) is thought of as an acceptable alternate to barrier-based filtration for particulate capture/removal in applications such as pollution control or the cleaning of the output of industrial processes. Electrostatic precipitation refers to a form of filtration device that removes particles, like dust and smoke, from a flowing gas using the force applied to the particles by an electric field after inducing an electrostatic charge on the particles. However, conventional experience and a limited understanding of its capabilities have limited its application in other use cases or environments. For example, conventional uses of dry-type electrostatic precipitators operate in the velocity range of 3 to 4 ft./second with a collection area to flow rate ratio of between 200 and 600 $ft^2$/1000 acfm ("specific collection area" or SCA). Wet-type electrostatic precipitators (where the airflow is treated to produce an increased humidity level) operate at somewhat higher velocities, up to 10 ft./second, and somewhat lower SCAs, 100 to 300 ft²/1000 acfm.

These experience-based factors could (at least in theory) be used to design an electrostatic precipitator for cleaning turbine inlet air; but as recognized by the inventor, such designs would have several serious disadvantages. These include that such a design would be (1) impractically large for the desired operating environments and (2) would consume an excessive amount of electric power for many uses (because the power is, to a large extent, proportional to the size of the electrostatic precipitator).

Thus, neither conventional barrier based filtering or electrostatic filtering as conventionally used are optimal for removing particulate matter from the intake air stream of a turbine or a system in which a turbine is used for power generation. Embodiments of the invention are directed toward solving these and other problems individually and collectively.

SUMMARY

The terms "invention," "the invention," "this invention" and "the present invention" as used herein are intended to refer broadly to all of the subject matter described in this document and to the claims. Statements containing these terms should be understood not to limit the subject matter described herein or to limit the meaning or scope of the claims. Embodiments of the invention covered by this patent are defined by the claims and not by this summary. This summary is a high-level overview of various aspects of the invention and introduces some of the concepts that are further described in the Detailed Description section below. This summary is not intended to identify key, required, or essential features of the claimed subject matter, nor is it intended to be used in isolation to determine the scope of the claimed subject matter. The subject matter should be understood by reference to appropriate portions of the entire specification of this patent, to any or all drawings, and to each claim.

Embodiments of the invention involve the application of a disk-in-tube type of "wet" or "dry" ESP (electrostatic precipitation) technology for the capture/removal of airborne particles entering a turbine generator or a turbine compressor (both of which are denoted by the term "turbines" herein). As recognized by the inventor, this provides an effective method of particulate removal without the inefficiencies associated with conventional filtering techniques (such as an increase in the pressure required to move the incoming air through the filter and the corresponding loss in total airflow). Embodiments of the innovative approach also eliminate the inlet airstream blocking effect of a conventional filter, thus making its use and operation adaptable to different operating environments and processes that require clean input air streams (including industrial manufacturing processes, power generators, combined turbine and fluid recapture systems for use in heating and cooling, etc.).

In one embodiment, the invention is directed to a system and associated method for removing undesirable particulate matter in the air stream entering a turbine using electrostatic precipitation.

In another embodiment, the invention is directed to a system and associated method for removing undesirable particulate matter in the air stream entering a turbine using electrostatic precipitation, along with pre-cooling of the air stream using fogging nozzles or another form of evaporative cooling spray at the inlet to the electrostatic precipitator.

In another embodiment, the invention is directed to a system and associated method for removing undesirable particulate matter in the air stream entering a turbine using a tube-type electrostatic precipitator, with the provision of indirect cooling of the air stream through the use of a cooling fluid circulating on the outside of the precipitator collection tubes or channels.

In another embodiment, the invention is directed to a system and associated method for removing undesirable particulate matter in the air stream entering a turbine using a tube-type electrostatic precipitator (ESP), with one or more stages of such a precipitator being placed to intercept the airflow. Collection or sedimentation chambers may be placed in between one or more pairs of the stages to trap the particulate matter removed from the airflow. The stages may be operated at the same or at different voltages or pulses of voltages; further, in some embodiments, the operating parameters of one or more of the ESP stages may be determined by data collected by sensors associated with each stage. The voltages or voltage pulses used to operate a stage or stages may depend on processing the data collected by the sensors.

In another embodiment, the invention is directed to a method and apparatus for removing undesirable particulate matter in the air stream entering a turbine through the use of a tube-type electrostatic precipitator as part of a larger system that includes implementation of a combined cycle process, wherein low-grade steam (such as might be output by a steam turbine powered by a heat recovery steam generator) could be utilized by an "absorption chiller" to make a cooling fluid for use in cooling the airflow by arranging for the fluid to be directed along the outside of the precipitator collection tubes or channels, as referred to above.

In one embodiment, the invention is directed to a system, where the system includes:

a first array of substantially parallel tubular elements, wherein each tubular element includes a substantially central first electrode and a second electrode formed on the wall of each tubular element, the first array positioned to permit an airflow to enter a first end of the first array and to exit a second end of the first array;

a source of energy operable to generate an electric field within each tubular element of the first array by applying a potential difference across the first and second electrodes of each tubular element, wherein the electric field gradient produced within each tubular element is substantially equal to or greater than 25 kV/inch; and a gas turbine positioned to receive the airflow after it has exited the second end of the first array of tubular elements, the gas turbine including a compressor for the airflow, a fuel combustion chamber, and a turbine.

Other objects and advantages of the present invention will be apparent to one of ordinary skill in the art upon review of the detailed description of the present invention and the included figures.

BRIEF DESCRIPTION OF THE DRAWINGS

Embodiments of the invention in accordance with the present disclosure will be described with reference to the drawings, in which.

Note that the same numbers are used throughout the disclosure and figures to reference like components and features.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments of the invention will be described more fully hereinafter with reference to the accompanying drawings, which form a part hereof, and which show, by way of illustration, exemplary embodiments by which the invention may be practiced. This invention may, however, be embodied in many different forms and should not be construed as limited to the embodiments set forth herein; rather, these embodiments are provided so that this disclosure will satisfy the statutory requirements and convey the scope of the invention to those skilled in the art.

Embodiments of the invention involve the application of disk-in-tube type ESP (electrostatic precipitator) technology for the capture/removal of airborne particles entering a turbine. This provides a mechanism for the removal of particulate matter without the disadvantages associated with conventional filtering methods (such as a negative impact on the operational efficiency of the turbine). By using ESP as the mechanism for particulate removal, embodiments of the inventive system and apparatus provide an effective filtering mechanism without the parasitic reduction in pressure that is typically caused by a barrier filter or particle trap that has a cross-section which is a substantial fraction of the cross-section of the incoming airstream.

As noted, conventional turbine-based systems (and other types of systems) use a fabric-based filtration device to remove undesirable particulate matter from the entering airstream. This is an important process as particles in the air can erode, corrode and build up on the turbine blades, thereby reducing the efficiency of the unit. While fabric filters can operate to remove the undesirable particles, even when clean they are the source of an inherent pressure drop which is a parasitic load on the turbine (thereby impacting its overall efficiency). Additionally, fabric filters plug-up over time as the particles accumulate, which adds to the parasitic load on the turbine. This means that the negative impact on the turbine efficiency increases between filter cleanings or replacement, even though some systems may include a cleaning mechanism which is triggered after a sufficient pressure reduction. Finally, fabric filters eventually need to be changed, which requires turbine downtime and continuing maintenance expenditure.

In some embodiments of the inventive system and methods, fabric filters or barriers are replaced by (or used in conjunction with) a high-velocity disk-in-tube type electrostatic precipitation (ESP) unit or module (typically formed as an array of disk-in-tube type precipitators). This approach results in a lower initial pressure drop and substantially eliminates the possibility of particulate caused plugging (and thereby further degradation of the turbine efficiency) because the tube-type channels of the ESP do not block the flow of the incoming air to the same degree as a physical filter or barrier.

FIGS. 2(A) through 2(D) are diagrams illustrating an example single tubular element of an array of such elements, and how the tubular elements may be used as part of a process to remove particulate matter from an airflow in an embodiment of the inventive ESP filtering device as used in a turbine system. As suggested by the figures, each tube, tubular element, or channel 202 includes a central electrode 204, along which are spaced circular disks 206. A potential difference is created between the central electrode 204 and the inner wall of the tube 208. A gas or fluid 210 (such as an intake airflow) enters the tube; the gas or fluid may contain particulate matter 212 which it is desired to remove before further use of the gas or fluid.

Figure 2A:
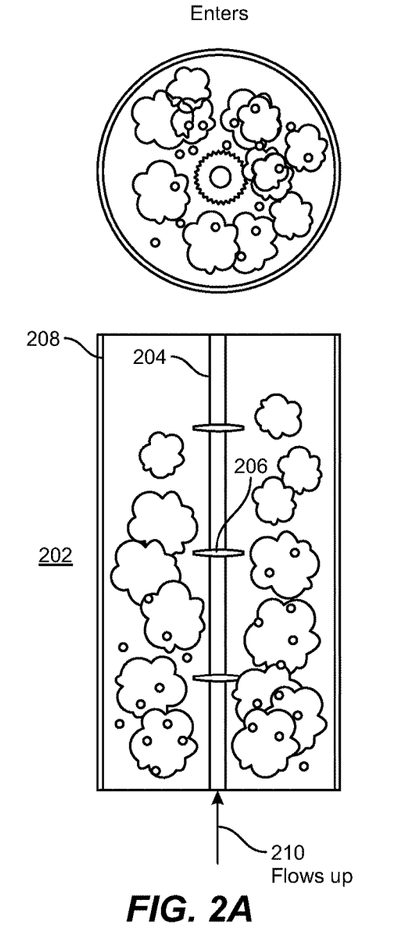
FIGS. 2(A) through 2(D) are diagrams illustrating a single tubular element of an array of such elements, and how the tubular elements may be used as part of a process to remove particulate matter from an airflow in an embodiment of the inventive ESP filtering device as used in a turbine system.
Figure 2B:
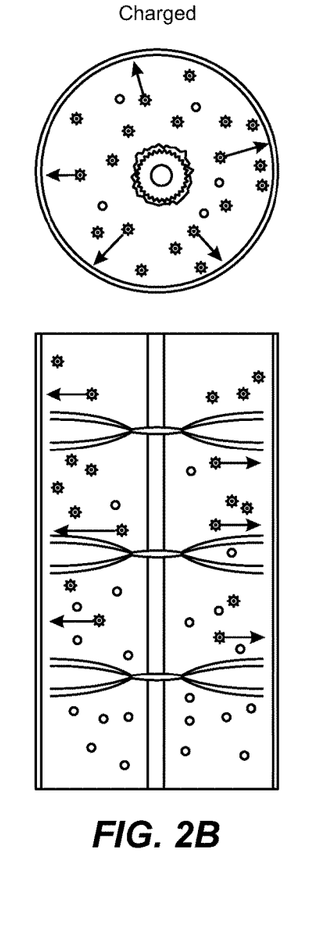
Figure 2C:
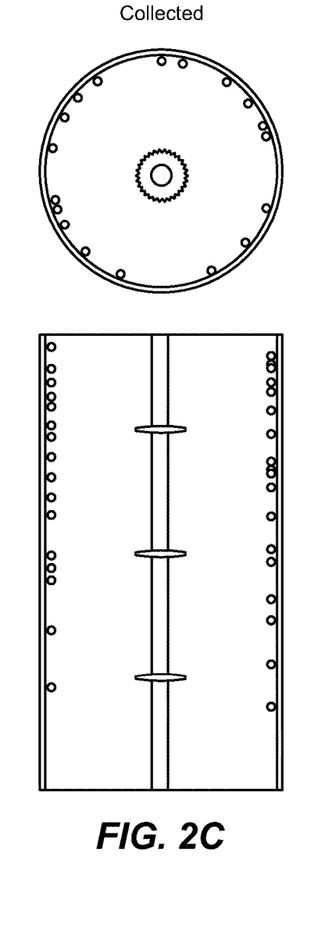
Figure 2D:
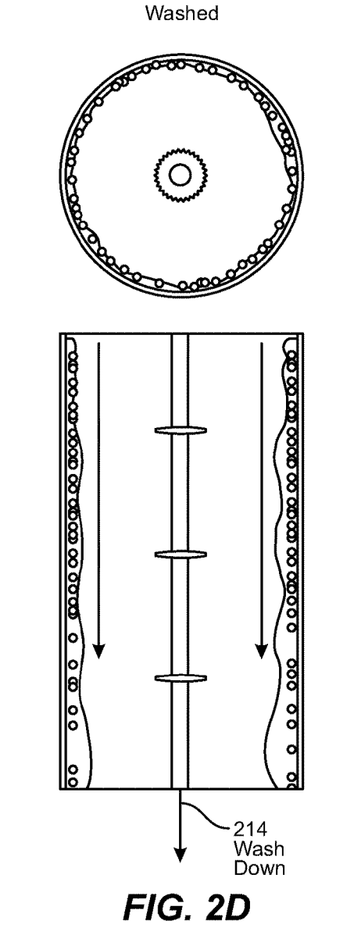

The gas or fluid and particulate matter enters the tubular element and is subjected to an ionizing electric field created by the potential difference applied between the electrodes (note that the figures do not show the power supply or the connections between the power supply and the electrodes). The resulting charged particles (with positive or negative charge, as shown in FIG. 2(B)) are then subject to the force applied to the charged particles by the electric field inside the tubular element. This causes the charged particles to be accelerated and to impact the inner walls of the tubular element (208), where they are "collected", as shown in FIG. 2(C). If desired, the interior of the tubular element may be cleaned by use of a washing fluid 214, typically water, as shown in FIG. 2(D).

Note that an array or other form of arrangement of tubular elements 202 may be formed from multiple of the individual elements 202 and positioned to encounter an airflow or other form of gas or fluid that it is desired to clean or purify. Further, note that one aspect of the tubular element is to provide a channel through which the gas or fluid may flow with minimal collisions or interactions with structures; this serves to minimize the impact on the incoming flow and provide an effective particle removal mechanism without reducing the characteristics of the flow needed (or optimal) for the operation of a follow-on device, such as a turbine.

Figure 3A:
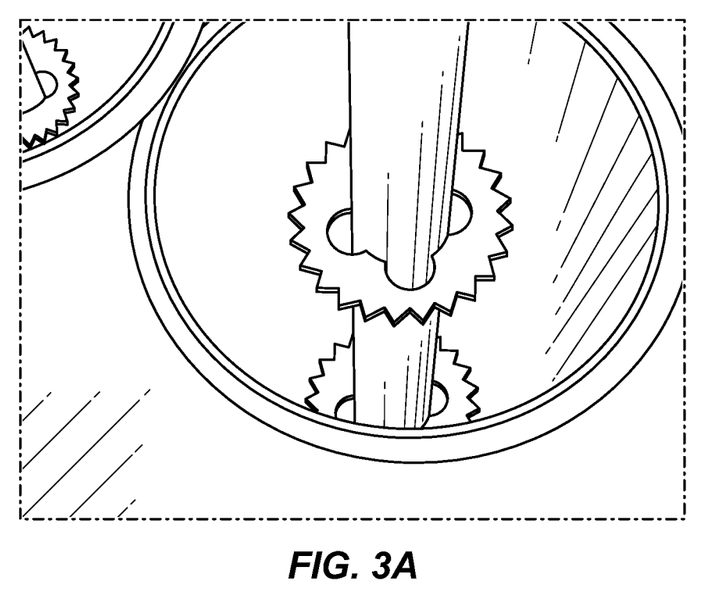
FIG. 3 is a diagram illustrating images of a top (FIG. 3(A)) and bottom view (FIG. 3(B)) of an array of tube-type electrodes that may be used in a ESP filtering device or apparatus.
Figure 3B:
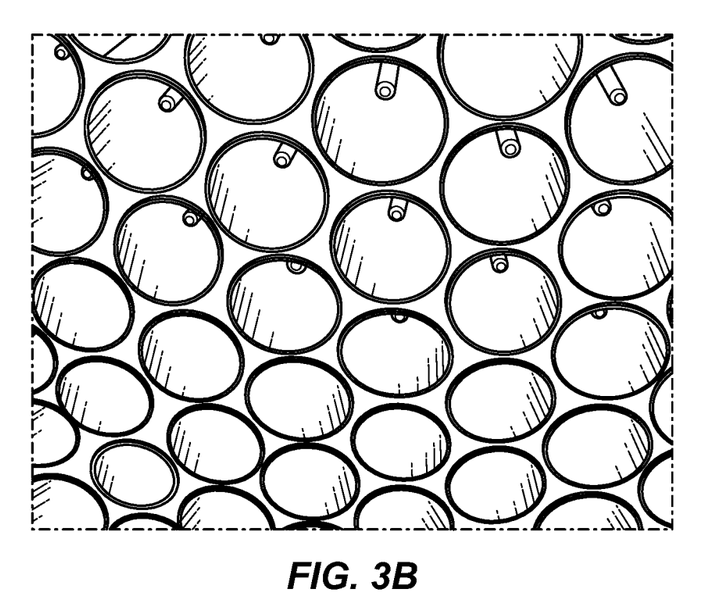

FIG. 3 is a diagram illustrating images of a top (FIG. 3(A)) and bottom view (FIG. 3(B)) of an array of tube-type electrodes that may be used in a ESP filtering device or apparatus. As shown in FIGS. 2 and 3, the tube-type ESP is an open flow device wherein air is directed through a channel defined by two electrodes (e.g., a center electrode and an inner wall of the tube) that create an ionizing electric field—the ionized particles are then removed from the airstream by the action of the force applied by the electric field. Note that use of the inventive device and methods has the benefit of eliminating the need for a filter change or additional components used for cleaning a fabric type filer, and thus saves down time of the turbine system and replacement costs for the filter. This is because the inventive system substantially eliminates the possibility of filter clogging or plugging, which might otherwise necessitate the immediate shut down of the turbine using the cleaned airstream as an input, or of an industrial process that is contributing to the airstream (or fluid stream) that is being filtered.

In some embodiments, the use of the ESP filter could also provide an inherently lower overall pressure drop than fabric based barrier filtration, and a drop that does not change over time (as does the pressure drop caused by particulate accumulation on a fabric based filter). As noted, an ESP based filtering mechanism comprised of an array of tubes through which air flows provides a situation in which the intake airstream flows through a channel, largely without being impeded by a physical filter; this provides a reduced cross-section for particle accumulation and the resulting reduction in airflow, as compared to a fabric filter placed across an airstream.

With respect to the operation of this type of filtering mechanism with a turbine, in some embodiments, its operation may be made independent of that of the turbine itself. For example, the filtering apparatus itself would not need to be integrated with the turbine operation; thus, if the high voltage power supply providing power to the electrodes were to be turned off, fail or be reduced in effectiveness, the turbine itself would still be capable of operation because of the airflow through the ESP tubular components; this is in contrast to the airflow being significantly impeded by a barrier such as a filter, which may block a sufficient amount of the airflow due to particulate build up and cause a turbine to need to be shut down.

Note that one reason for this benefit is that an ESP-based device does not need to intersect the path of a particulate to be able to remove it from the airflow. Due to the operation of an ESP device in ionizing the particulate matter while creating an electric field capable of applying a directional force to the ionized particles, the particles are quickly removed from the airstream by the action of the electric field force instead of due to hitting a physical barrier (and being larger than the filter openings through which the air flows).

As background and to aid in understanding why conventional uses of ESP would not suggest that it could be used as described herein, note that the disk-in-tube electrostatic precipitator was originally patented by James Schwab and David Goodson in 1980 (U.S. Pat. No. 4,194,888).

As recognized by the present inventor, this design is unique in that it offers the possibility of operating at much higher electric field strengths than conventional wire-in-tube or plate-and-frame ESPs. For example, laboratory and initial testing by the inventor have suggested that the achievable electric field can be greater than 32 kilovolts per (kV) per inch (i.e., a potential difference of 32,000 volts over a distance of an inch). This is a significant improvement over conventional implementations of an ESP based filter and is important for one or more of the following reasons:

this field strength assists in more rapidly and efficiently ionizing the particles in the airflow;

this field strength is responsible for creating a sufficient force on the ionized particulate matter to produce a particle velocity which enables particle removal from the intake airflow quickly and efficiently, to minimize the negative impact on the turbine operation and possible damage to the turbine elements;

this field strength can effectively remove particulate matter from the types of intake airflows (i.e., with regards to particulate concentration and speed/velocity) encountered in turbine operation and that may be required for sufficiently efficient turbine operation; and     this field strength enables the separation of the ionized particulates from the intake airflow over a relatively small distance compared to other uses of ESP based filtering mechanisms, thereby making possible a small enough filtering apparatus to be used in certain desirable environments and use cases.

Thus, while ESP devices have been recognized as being effective at removing particulates from a gas stream in cases of pollution control or industrial process cleaning, it is conventionally believed that an ESP-based device could not or would not be effective in the operating environment of a turbine. While the reasons for this misconception are many, the primary one relates to the following:

a conventional dry ESP or wet ESP apparatus would be too large for practical use, because in either case the electric field strengths that are normally used as a basis for the design of such systems are relatively low. Thus, the predicted size for turbine inlet air filtration requirements would have to rely on very low treatment velocities and very high residence times, making the machine impractically large. As recognized by the inventor, only a relatively high electric field strength would allow the design of a machine that was small and compact enough to be practical;

as a result, it was believed that the electric field strengths required to effectively remove the particles in the operational setting or environment of a turbine could not be achieved using a conventional ESP device—this is partly the result of a turbine operating on a relatively high speed air stream as opposed to an emissions control use case (which is the environment in which ESP filtering is best understood), where such a higher speed air flow means by necessity that a particle must be removed relatively quickly in order to avoid requiring a large device (which would be impractical in many settings).

As suggested, one implication of the relatively strong electric field that can be achieved by an embodiment of the inventive system and device is that the size of the electrostatic precipitator element(s) can be relatively small in physical size compared to conventional (operational) designs, which are only capable of operating at maximum field strength values of 15 kilovolts per inch (kV/inch). This limit on the field strength achievable by an ESP-based filtering mechanism when used in an emission control application (which contributes to a belief in the undesirability of using a tube-type device for treatment of intake airflow for a turbine) arises because of two main factors:

1. High Concentrations of Particulate Matter—typically, the number of particles to be removed/collected in an emission control or industrial process cleaning application of electrostatic precipitation is relatively high. Because of this, the collecting electrode of an ESP experiences a rapid accumulation of solids on its surface. This accumulation forms into thick (i.e., >>1 mm) and uneven accretions on the anode surface of the ESP tubes/channels. Such thick, uneven, accretions tend to focus the electric field at the anode and cause ionization at the surface of the anode. When such ionization occurs at the anode, the adjacent ionization at the cathode results in a spark which defines the voltage limit, and that limit is lower than needed (or desired) for effective operation in a turbine use case—note that as recognized by the inventor, the airflow being filtered in the case of a turbine typically has a particulate density that is orders of magnitude less than in an air pollution control setting; and 2. Liquid Droplet Carry Over—with wet-type ESP devices or methods, the first step in the process is a quenching of the gas stream to its adiabatic saturation temperature, i.e., the wet bulb temperature. This can be achieved in at least two distinct ways:

(1) use essentially the exact amount of water needed to complete the process of saturation, without any un-evaporated water being left over in the gas stream prior to entry into the electrostatic zone. This approach necessarily requires specialized nozzles that create very fine spray droplets (fog) to ensure complete evaporation of each droplet. This approach has not found widespread acceptance in air emission applications because using only the exact amount of water does not provide sufficient irrigation/cleaning of the ducting and plena upstream of the electrostatic zone, which will result in troublesome accretions on the ESP tube/channel surfaces. In typical air emission applications with heavy loadings of particulate matter, the formation of such accretions is not acceptable, at least in part because they can be relatively massive, requiring vessel entry and manual removal to prevent a severe degradation of the system performance—this contributes to a perception of the undesirability of using a tube-type ESP device for filtering of turbine airflow; or (2) utilize much greater liquid flow rates than what is necessary to achieve saturation. This allows the upstream liquid sprays to both saturate the gas stream and to irrigate the inlet surfaces to wash away material that may form troublesome accretions. However, in most circumstances, such an approach cannot rely on the availability of sufficient fresh (i.e., relatively clean) water and instead creates a significant wastewater treatment requirement, because the quenching water will capture contaminants as it contacts the dirty air/gas stream. Thus, in this case the water must be recycled. Recycling dirty water requires the use of coarse sprays (i.e., large orifice nozzles) which produce a large volume of large droplets as well as fine droplets. Before entering the electrostatic zone, the bulk of the droplets carrying suspended particles are typically eliminated using a cross flow mist eliminator, a cyclonic separator, or in some cases a settling chamber. This droplet elimination phase is necessary because a high volume of droplets penetrating the electrostatic zone will greatly disturb the electric field and cause sparking at a relatively low voltage; this will compromise the effectiveness of the electrostatic precipitator. Further, regardless of the mist elimination technique used, there are inevitably some droplets that will penetrate the electrostatic zone; i.e., no mist elimination technique is 100% efficient. These penetrating droplets also tend to reduce the maximum operating voltage by causing electric field disturbance(s), albeit not to the extent described above. The need for a suitable source of clean water also contributes to the perception of the undesirability of using a tube-type ESP device for filtering of turbine airflow As recognized by the inventor, because of at least these two effects, electrostatic precipitation as used for emission control applications has fundamental limitations. As noted, the practical limit of the operating field strength is roughly 15 kV/inch in conventional ESP designs and up to 20 kV/inch with the disk-in-tube design described in the '888 (Goodson/Schwab) patent mentioned previously. Given the relationship of operating field strength to ESP size as described previously, emission control ESPs are necessarily physically large devices, in the tube-type configuration ESP, this results in many relatively large diameter tubes with long discharge electrodes. Finally, because the machines are physically large, achieving the tight alignment tolerances necessary to allow for operation at extreme electric field intensity is difficult, and is an additional factor limiting the achievable electric-field strength.

One or more of these factors have contributed to the conventional "wisdom" being that use of ESP devices (including disk-in-tube designs) was not feasible and/or practical as a way of removing particulate matter from the airflow being used as an intake to a turbine or compressor.

However, as recognized by the inventor, in treating ambient air in front of a turbine (as opposed to air pollution emissions), the quantity of material to be collected is much less than in air pollution control or industrial process applications; for example, typically 2 to 3 orders of magnitude less. Therefore, the collecting tubes/channels can be smaller and can operate at much higher voltages and in doing so, approach the 32 kV/in level achieved in the laboratory. One result of one or a combination of these factors is that the voltage limiting factors present in the larger emission control and industrial process cleaning devices, i.e., material build up, droplet carry over, poor tolerances and mechanical vibrations, are not present or are largely eliminated in the inventive system and device, thus allowing operation at a level that produces the higher electric field gradient.

In addition, if operated in the mode of a "wet-ESP" device, the problem of coarse droplets can largely be eliminated using well-controlled atomizing nozzles that produce a very fine mist (fog) using fresh "demineralized" water instead of dirty recycled water. Finally, because the inventive ESP device as used in an ESP-Turbine system can be relatively small, it can be manufactured to much tighter machine tolerances than the larger air emission control or industrial process treatment type of device.

As mentioned, in one embodiment, the electrostatic precipitator may be used as a "wet" electrostatic precipitator by employing upstream fogging nozzles to cool the incoming air; this will increase the electrical generating efficiency of a turbine-driven electric generating unit. A tube type ESP precipitator would also act as a mist eliminator, thereby avoiding problems with water droplets affecting the high speed turbine blades downstream. Also, if properly implemented, the collected water could then act to keep the collecting surfaces of the tube type precipitator clean, thus avoiding build-up and a possible reduction in particle collection efficiency. In one example embodiment, implementation could be through an array of overhead spray nozzles which would be activated by a timer or PLC-type control (programmable logic controller) for a pre-determined period and interval. The spent flush water would be passed into a storage tank and could be re-used.

Figure 1B:
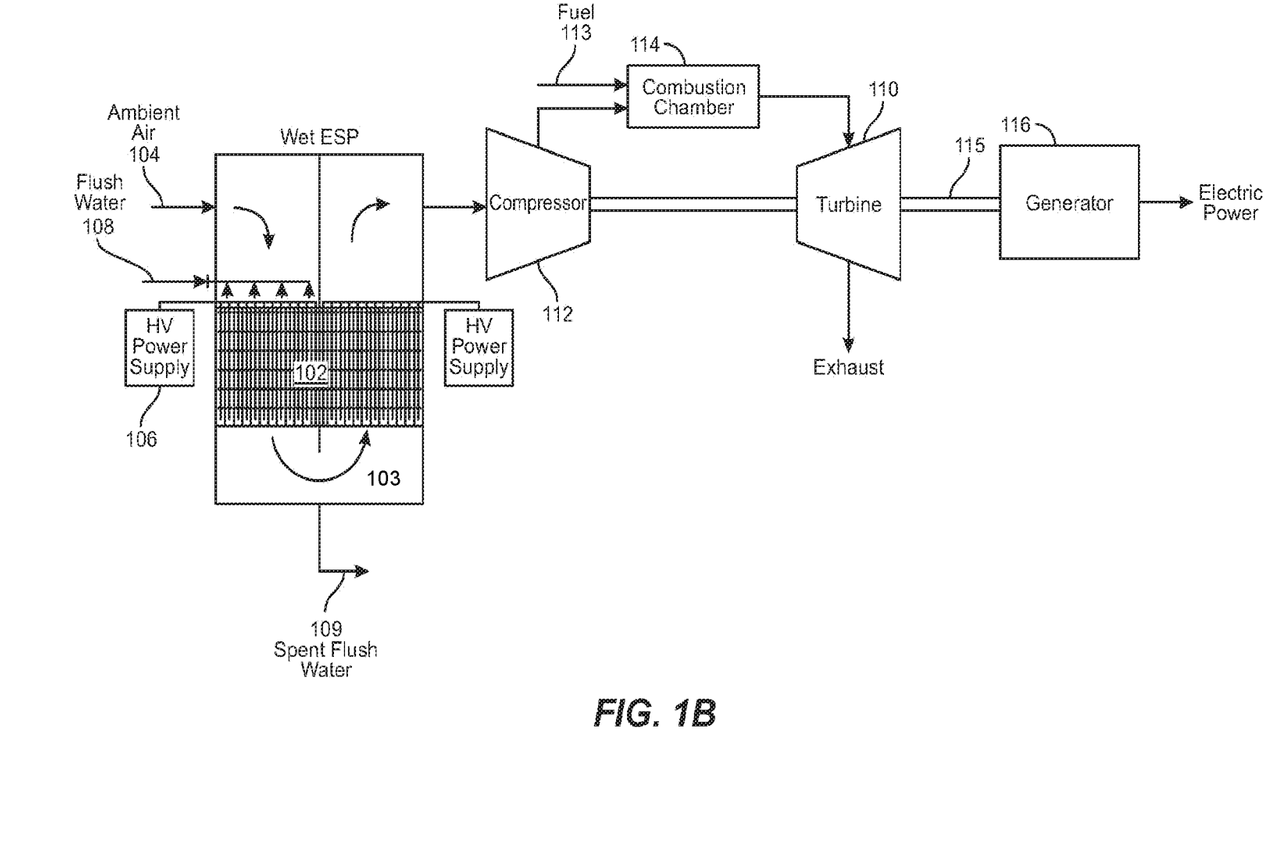

FIG. 1(B) is a diagram illustrating the inventive use of an ESP as part of a turbine system (such as a gas-fired turbine generator). As shown in the diagram, in one embodiment a set of ESP tubes or channels is provided 102, through which the ambient incoming airstream 104 is directed. Each tube contains two electrodes; a first represented by a central mast and a second represented by the inner wall of the tube. Upon application of a suitable potential difference between the electrodes, an electric field is established within the tube. The potential difference is provided by a suitable power supply 106 (shown as "HV Power Supply" in the figure). The electric field is sufficient to ionize the gases and electrostatically charge substantially all the particulate matter in the entering airstream. The ionized particles are then forced to the wall of the tube by the electric field caused force, and thus are removed from the airstream. A source of water 108 is used to flush the tubes and reduce particulate buildup; the water or other fluid is removed through a spent flush water outlet or tubing 109. The "wet ESP" device as shown in the illustration operates to remove particulate matter from the airstream with minimal blockage of the airflow. This permits the airflow to be used as part of the overall operation of the turbine 110 in the customary manner (that is, after being subjected to compression by compressor 112, and mixed with fuel 113 in a combustion chamber 114). After the resulting combustion is used to operate the turbine 110, the turbine shaft 115 is used to operate a generator 116 (such as a motor) to produce electrical power.

As recognized by the inventor, adaptation of the tube-type ESP design for this use case is particularly beneficial because of the unique performance characteristics of this design. For example, the reader is referred to U.S. Pat. No. 4,093,430 issued Jun. 6, 1978, U.S. Pat. No. 4,110,086 issued Aug. 29, 1978, and U.S. Pat. No. 4,194,888 issued Mar. 25, 1980; each describe aspects of a disk-in-tube type electrode arrangement for generating a strong electric field. As also recognized by the inventor, the disk-in-tube arrangement enables the development of a high voltage corona at very high field strength. This is because the arrangement allows a highly focused electric field at the cathode with a very diffuse and uniform electric field at the anode, thus preventing arc-over until extremely high electric field strengths are reached.

For example, in laboratory operation by the inventor, an electric field value of over 32 kV/inch has been achieved. This relatively high electric field strength is particularly important because the performance of an ESP is directly related to the square of the electric field strength, as described in the Deutsch Equation, below:

$$\text{Efficiency} = 1 - e^{-AW/Q}, \text{ where}$$

A=Precipitator collecting area (ft$^2$)
Q=Gas flow rate (ft$^3$/min)
W=effective migration velocity (ft./min)
and $$W \propto E^2, \text{ where}$$

E=Electric field strength (kV/inch)
thus $$\text{Efficiency} = 1 - e^{-A(E \times E)/Q}$$

Given this relationship, one can determine that doubling the electric field strength allows the area of the precipitator to be reduced by a factor of 4.

As mentioned, currently, ESP technology has not found use in providing airstream filtering in gas turbine engines and generators. As recognized by the inventor, possible reasons for this include, but are not limited to the following:

- conventional thought is that the voltage gradient required for a practical ESP filtering device in a turbine setting could not be achieved;
- conventional thought is that the airflow or airstream velocity desired for turbine operation and turbine operating environments would be too high for a system that incorporated a ESP filtering device;
- conventional thought is that barrier filtration methods would outperform electrostatic precipitation methods; however, as realized by the inventor, this is not necessarily true for this operating environment and use case; and
- conventional thought is that a wet or dry-ESP device would not be feasible, as it would be too large to be practical in the desired operating environment and use case.

However, as recognized by the inventor and as described herein, the disk-in-tube type design permits a device configuration that outperforms other forms of electrostatic precipitation devices for this use case; these other forms include cross flow, plate-type designs, and vertical flow designs employing square and/or hexagonal tubes. As an example, tests conducted by Air Pollution Systems (the assignee of the original disk-in-tube patents) at a pulp mill in Bellingham Wash. in 1978 showed a particle migration velocity ("W" in the previous equation) in the range of 75 ft./minute; published data for other ESP designs describe migration velocity data at no more than 25% of this value.

Figure 4A:
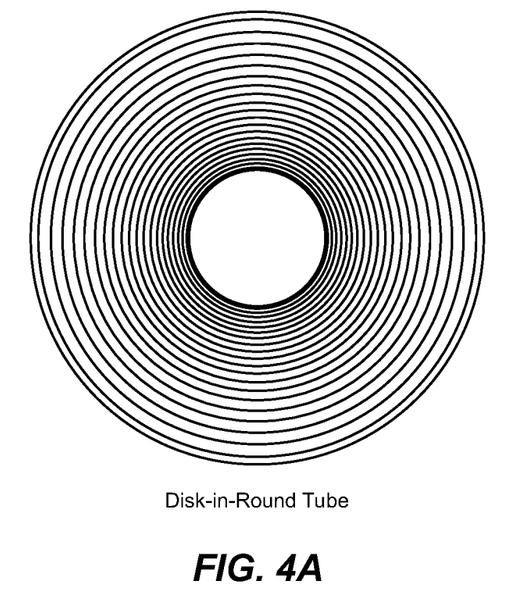
FIG. 4 are diagrams of a computer simulation of the equipotential levels of the scalar potential field (the gradient of which are the electric field lines) for a disk-in-round tube (FIG. 4(A)) and a disk-in-hex tube (FIG. 4(B)) electrode arrangement, where such electrode arrangements may be used in implementing an embodiment of the inventive system and apparatus.
Figure 4B:
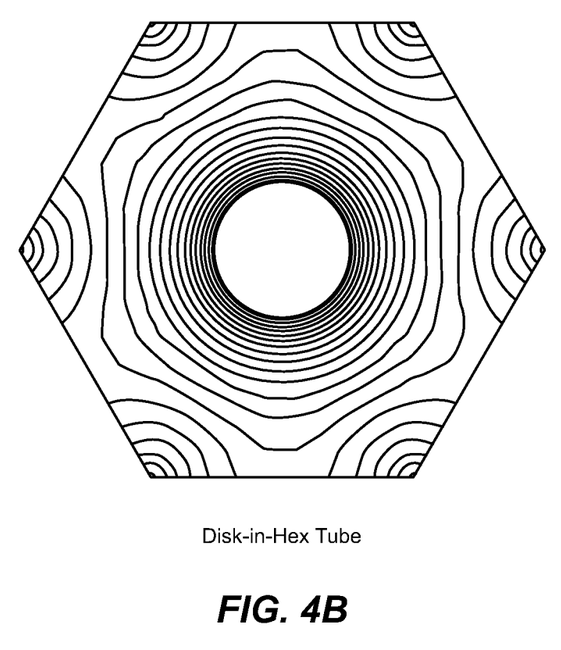

Furthermore, theory supports the inventor's and others' empirical observations. A computer model showing the equipotential levels of the scalar potential field (the gradient of which are the electric field lines) for a disk-in-round tube arrangement compared to the scalar potential field distribution of an equivalent disk-in-hex tube arrangement shows a much more uniform potential field and less discontinuities at the anode for the disk-in-round tube electrode configuration. This is suggested by the images of FIG. 4, which are diagrams of a computer simulation of the equipotential levels of the scalar potential field for a disk-in-round tube (FIG. 4(A)) and a disk-in-hex tube (FIG. 4(B)) electrode arrangement, where such electrode arrangements may be used in implementing an embodiment of the inventive system and apparatus. As mentioned, electric field non-uniformities at the anode surface give rise to voltage-limiting sparks/arcs. Thus, the reduction or elimination of non-uniformities at the anode surface allows for higher arc-over-voltage and better performance. Because the electric field (and as a result, the force on a charged particle) is derived from the gradient of the scalar potential field, FIGS. 4(A) and 4(B) indicate that the electric force distribution is irregular within the hexagonally shaped version of the electrode; this will increase the likelihood of operating voltage limiting arcs, and supports using a disk-in-round tube electrode configuration.

Note that if designed for a turbine inlet air cleaning application, the disk-in-tube configuration is expected to achieve electric field strengths that more closely resemble the laboratory achieved level of 32-33 kV/inch, rather than the industrial achievement of 20 kV/inch for a disk-in-tube type of electrode arrangement. This is because as also recognized by the inventor, in the turbine environment, the electrodes will be operating on ambient air which is several orders of magnitude cleaner than industrial process gases, and because the proposed design will be fabricated as a much smaller and more tightly aligned machine than its larger and less precise industrial version.

Note that the higher achievable field strength is significant because as a general concept, the particle migration velocity (i.e., the velocity vector normal to the gas flow direction) increases as the square of the field strength. Thus, the migration velocity at 32-33 kV/inch is approximately 2.7 times the migration velocity at 20 kV/inch. This factor also applies to the precipitator size, so that a precipitator operating at the higher field strength would be smaller by this factor than one operating at 20 kV/inch (relative size=1/2.25=37%); these results follow by application of the Deutsch equation mentioned previously. These aspects support use of the inventive system in turbine applications, as a higher electric field gradient provides the benefit of more effective airstream filtering, while making the inventive device more feasible to use in turbine operating environments and systems. In general, the combination of reduced size coupled with increased electric field gradient provides both better performance and greater feasibility in certain use cases or operating environments.

Figure 5:
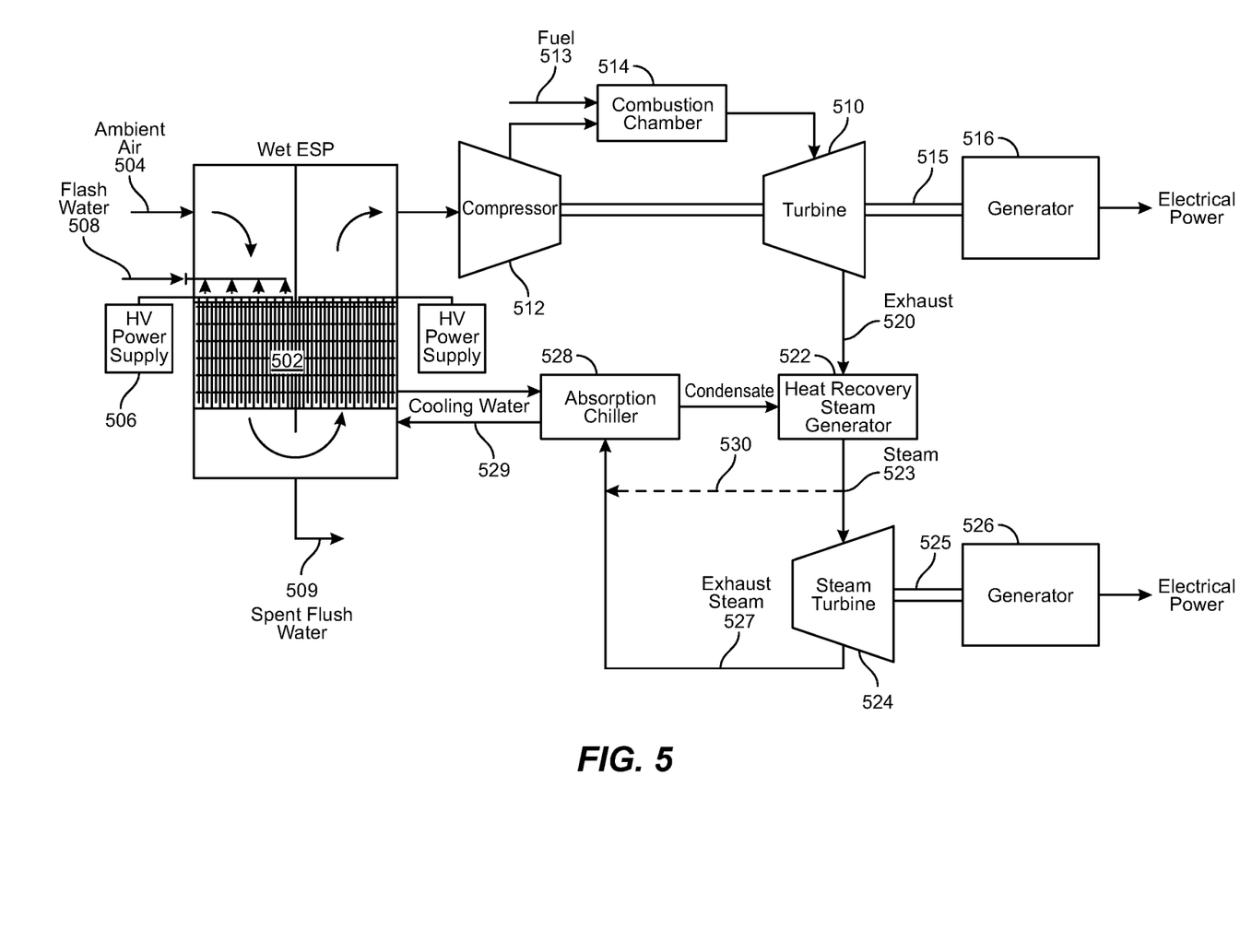
FIG. 5 is a diagram illustrating a combined-cycle system used to produce electrical power that utilizes an ESP device of the type described herein, and that may be implemented in accordance with an embodiment of the inventive concepts.

FIG. 5 is a diagram illustrating a combined-cycle system used to produce electrical power that utilizes an ESP device of the type described herein, and that may be implemented in accordance with an embodiment of the inventive concepts. In this diagram, a wet ESP device operates as described with reference to FIG. 1. In one embodiment, a set of tubes/channels is provided 502, through which the ambient incoming airstream 504 is directed. Each tube/channel contains two electrodes; a first represented by a central mast and a second represented by the inner wall of the tube. Upon application of a suitable potential difference between the electrodes, an electric field is established within the tube. The potential difference is provided by a suitable power supply 506 (shown as "HV Power Supply" in the figure).

The electric field is sufficient to ionize the airflow gases and create charged ions from substantially all the particulate matter in the entering airstream. The ionized particles are forced to the wall of the tube/channel by the electric field created force and thus removed from the airstream. In one embodiment, a source of water 508 is used to flush the tubes and reduce particulate buildup; the water or other fluid is removed through a spent flush water outlet or tubing 509. The "wet ESP" device as positioned in the illustration operates to remove particulate matter from the airstream with minimal blockage of the airflow. This permits the airflow to be used as part of the overall operation of the turbine 510 in the customary manner (that is, after being subjected to compression by compressor 512, and mixed with fuel 513 in a combustion chamber 514). After the resulting combustion is used to operate the turbine 510, the turbine shaft 515 is used to operate a generator 516 (such as a motor) to produce electrical power.

The combined-cycle use case or implementation uses the ESP device to both clean the inlet air to the turbine and as part of an integrated combined cycle system. Here the low-grade heat exhaust 520 from the primary turbine 510 (which is typically approximately 700° F.) is used to generate steam in a heat recovery steam generator (HRSG) 522. The output steam 523 from HRSG 522 can be used as an input to operate a second turbine, steam turbine 524; this can be used to generate electricity by means of turbine shaft 525 and generator 526 (such as a motor). In addition, or instead, turbine 524 could be used for other heating applications (referred to as "Combined Heat and Power" or CHP).

In one embodiment, a portion or all of the output steam from the HRSG 522 may be provided as an input to an absorption chiller 528 (as suggested by dotted line 530 in the figure); in another embodiment (as described below), the steam produced by HRSG 522 is provided as an input to a steam turbine, which produces an exhaust/residual steam that is provided as an input to the chiller.

As mentioned, the secondary exhaust/residual steam 527 output by steam turbine 524 may be provided as an input to an absorption chiller 528, which operates to convert the input exhaust steam (and/or steam directly produced by HRSG 522) into cold water. Note that a main advantage of such chillers is that humidity does not affect the cooling capability; as a result, by using these devices it is possible to cool ambient air below its wet bulb temperature. This cold water (or other form of cooling fluid) may be used on the outside of the ESP collecting tubes 502 to cause cooling of the inlet air (as suggested by the flow of water 529 from chiller 528) and, as a side benefit, cause condensation to collect on the inside of the tubes. This condensation has the benefits of (a) enhancing collection and aiding particulate removal and (b) improving the efficiency of turbine 510, because a lower inlet airflow temperature results in higher operating efficiency. Note that the cold water or other form of cooling fluid may be arranged to flow either along or across the exterior of the tubes or tubular elements.

An Example Embodiment of the Inventive System or Apparatus

The following design parameters are based on the inventor's concepts as described herein, and represent an example of a configuration that incorporates a wet-ESP as part of an electrical power generating system.

For a 5 MW gas-fired turbine treating approximately 25,000 cfm of air, and for 99% particle removal efficiency, the required precipitator collecting area would be approximately 2000 ft$^2$. Using collecting tubes/channels that have a 4-inch diameter and are 4 feet long, a total of 375 tubes would be required. These tubes could be nested into a tube bundle with a size of 7.5'×7.5'×4'. This tube bundle with electrodes would be serviced by a 30 kV, 300 mA high voltage power supply. This would represent approximately 0.18% of the turbine electrical output (as found from 30 kV×300 mA=9 kW; 9 kW/5000 kW=0.18%). Note that this calculation is for purposes of providing a realistic example, and may vary depending upon environmental and operational factors.

By way of a comparison, for each 1 inch of pressure drop caused by a fabric filter or physical barrier, approximately 0.5% of the output of a turbine is lost and the fuel requirement is increased by 0.2%. In contrast, at least some embodiments of the invention disclosed herein are expected to have a pressure drop lower than approximately 0.5 inches w.c. (water column) per stage. Given that physical barrier filter devices typically have a pressure drop of over 1 inch w.c. per stage when clean, and higher than that when dirty, the lower pressure drop achievable by embodiments of the invention is expected to provide a beneficial impact on energy consumption, even when the amount of electrostatic power required for operation is considered.

Note that in one embodiment, the ESP device may be augmented by introduction of one or more sensors to determine a velocity of the airflow going through a tube or tubes, an ensemble of tubes, or an entire ESP filtering device (such as by measuring air velocity in front of and after a ESP filtering device or structure). A sensor or sensors may also be used to measure the electric field within a characteristic tube or tubes, and changes in the strength or uniformity of that field. The sensor signal(s) maybe used to determine an operating efficiency, detect sub-optimal electrode operation (due to degradation from particle impacts or particle accumulation), and possibly as part of an adaptive feedback control loop to vary the operating parameters of the ESP device. This may provide a capability to dynamically alter certain operating parameters (voltage potential across the electrodes, relative airflow speed at intake, etc.) to optimize performance under varying conditions of humidity, particulate type or concentration, etc. In some embodiments, the sensor data might be combined with turbine operating data to determine possible changes to the operational parameters of either or both of the ESP device and the turbine itself.

In another embodiment, the ESP device may be used in combination with a filter or physical barrier (such as a fabric based filter) positioned in front of the ESP device to prevent an object from entering a turbine. The filter may be relatively coarse and designed to prevent the passage of rocks, sand, machine parts, etc. into the turbine without compromising the performance of the ESP filter or significantly reducing the airflow (or fluid flow, if applicable).

In one example of this two-stage filtering process, a barrier for the removal of smaller particles, based on a particle's specific gravity and surface area, may be used. In one form of this design, a collection/settling chamber (or retention chamber) may be arranged following the first filtering process (that provided by the barrier), where the design is such that the upstream air velocity is lower than the settling velocity of certain types of particles. This would protect against large particles entering the turbine and capture micro particles in some environments and use cases.

In other embodiments, a two- or multi-stage ESP filtering device may be used in which more than a single ESP filter is placed into the airflow. The ESP filters may be operated at the same or at different voltage differences in order to most efficiently remove particles of certain sizes or types from the airflow. In some embodiments, the direction of airflow with regards to the first array may be substantially the opposite of the direction of airflow with regards to the second array.

Note that although embodiments of the inventive filtering system and device have been described with reference to their use with a turbine, the ESP filtering device or mechanism may also be used to remove undesired particulate matter from airflows or fluid flows that are part of other devices or processes. For example, an embodiment of the inventive system may be used to remove particulate matter (such as heavy metals, salts, debris) from an industrial process requiring relatively clean ambient air, where such industrial processes may include, but are not limited to, semiconductor manufacturing and processing, natural gas pipelines, chemical composition manufacturing, fluid distillation, etc.

As mentioned, an embodiment of the inventive filtering system and device may be used as part of a larger system that combines a turbine with the recapture of energy from the discharge of a heat recovery steam generator (HRSG), as used in a combined-cycle turbine system. In this embodiment, the discharge steam (523) from the HRSG (522) would be used in the operation of a steam turbine (524). Exhaust/residual steam (527) from the steam turbine (524) may be used to operate (or as part of the operation of) an absorption chiller (528). The discharge steam from the HRSG may also be used, either partially or in whole, as an input to the chiller. Chiller (528) produces a cold liquid (identified as "cooling water" 529 in the figure) that may then be used as an indirect cooling fluid, for example by directing it along the outside of (or across) the collecting tubes. This indirect cooling will increase the efficiency of the turbine. Note that a unique aspect of the inventive systems and methods is that the tube-type ESP would perform both the inlet air cleaning and cooling using the same set of equipment and processes (an example of this embodiment or use case has been described herein with reference to FIG. 5).

In general, the inventive system and methods are at least partially the result of the recognition by the inventor of the following factors or characteristics of the gas turbine use case or operating environment:

The use case being considered (air inflow in front of a turbine) is one in which there is a significant decrease in the quantity of particulate matter as compared to the more conventional pollution control uses;

Because the quantity of the particulate matter is so much less than in pollution control applications for ESP technology and because of the unique characteristics of the disk-in-tube design, the invention can achieve significantly higher electric field strengths than are traditionally found;

The higher field strength results in a higher effective migration velocity for the particles; and The higher effective migration velocity means that the ESP apparatus may be much smaller.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to each embodiment of the present invention.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

That which is claimed is:

1. A system, comprising:
   a first array of substantially parallel tubular elements having a substantially round cross-section, wherein each tubular element includes a substantially centrally positioned elongate first electrode and a second electrode formed on an inner wall of each tubular element, the first array positioned to permit an airflow to enter a first end of the first array, flow through the tubular elements, and to exit a second end of the first array opposite the first end, wherein the first electrode of each tubular element of the first array includes a plurality of radially extending disks with a center of each disk mounted along a length of the first electrode, and further wherein an outer edge of each disk is serrated with a plurality of notches distributed along the circumference of each disk;
   a second array of substantially parallel tubular elements having a substantially round cross-section, wherein each tubular element of the second array includes a substantially centrally positioned elongate first electrode and a second electrode formed on an inner wall of each tubular element, the second array positioned to receive the airflow at a first end of the second array after the airflow exits the second end of the first array and to provide the airflow at a second end of the second array opposite the first end;
   a source of energy operable to generate an electric field within each tubular element of the first array and the second array by applying a potential difference across the first and second electrodes of each tubular element, the potential difference being sufficient to generate an electric field between the electrodes in a range from substantially equal to 25 kV/inch to an electric field strength at which sparkover occurs between the electrodes;
   a particle retention chamber positioned to receive particulate matter removed by the first array of tubular elements before the airflow enters the second array of tubular elements; and
   a gas turbine positioned to receive the airflow after it has exited the second end of the second array of tubular elements, the gas turbine including a compressor for the airflow, a fuel combustion chamber, and a turbine.

2. The system of claim 1, wherein the first electrode of each tubular element of the first array and of the second array is a substantially rigid mast oriented substantially parallel to a direction of the airflow, with one or more concentric disks spaced along the length of the mast and oriented substantially perpendicular to the direction of the airflow.

3. The system of claim 1, further comprising an airflow cooling element arranged to perform a cooling process on the airflow prior to the airflow entering the first end of the first array of tubular elements.

4. The system of claim 3, wherein the airflow cooling element uses a cooling fluid, and further, wherein the cooling fluid is water.

5. The system of claim 1, further comprising a cooling fluid arranged to flow along or across the exterior of one or more of the tubular elements.

6. The system of claim 1, wherein the first electrode of each tubular element of the first array and the second array is operated with a negative polarity.

7. The system of claim 1, wherein the first electrode of each tubular element of the first array and the second array is operated with a positive polarity.

8. The system of claim 1, wherein the direction of airflow in the first array of tubular elements is substantially opposite to that of the airflow in the second array of tubular elements.

9. The system of claim 1, wherein the first and second tubular arrays are substantially vertical, and the particle retention chamber is positioned below the first array and the second array.

10. The system of claim 1, wherein the first tubular array, the second tubular array and the particle retention chamber are positioned so that the inlet air passes downwardly through the first array, substantially horizontally through the retention chamber and then upwardly through the second array.

11. The system of claim 1, wherein the first electrode of each tubular element of the second array includes a plurality of radially extending disks with a center of each disk mounted along a length of the electrode, and further wherein an outer edge of each disk is serrated with a plurality of notches distributed along the circumference of each disk.

12. The system of claim 1, further comprising a generator coupled to the turbine and operating to generate electricity in response to operation of the turbine.

13. A system, comprising:
   a first array of substantially parallel tubular elements having a substantially round cross-section, wherein each tubular element of the first array includes a substantially centrally positioned elongate first electrode and a second electrode formed on an inner wall of each tubular element, the first array positioned to permit an airflow to enter a first end of the first array, flow through the tubular elements, and to exit a second end of the first array opposite the first end, wherein the first electrode of each tubular element of the first array includes a plurality of radially extending disks with a center of each disk mounted along a length of the electrode;
   a second array of substantially parallel tubular elements having a substantially round cross-section, wherein each tubular element of the second array includes a substantially centrally positioned elongate first electrode and a second electrode formed on an inner wall of each tubular element, the second array positioned to receive the airflow at a first end of the second array after the airflow exits the second end of the first array and to provide the airflow at a second end of the second array opposite the first end, wherein the first electrode of each tubular element of the second array includes a plurality of radially extending disks with a center of each disk mounted along a length of the electrode;
   a source of energy operable to generate an electric field within each tubular element of the first array and the second array by applying a potential difference across the first and second electrodes of each tubular element, the potential difference being sufficient to generate an electric field between the electrodes in a range from substantially equal to 25 kV/inch to an electric field strength at which sparkover occurs between the electrodes;
   a particle retention chamber positioned to receive particulate matter removed by the first array of tubular elements before the airflow enters the second array of tubular elements; and
   a turbine positioned to receive the airflow after it has exited the second end of the second array of tubular elements.

14. The system of claim 13, wherein the first tubular array, the second tubular array and the particle retention chamber are positioned so that the inlet air passes downwardly through the first array, substantially horizontally through the retention chamber and then upwardly through the second array.

15. The system of claim 13, wherein the first electrode of each tubular element of the first array and of the second array is a substantially rigid mast oriented substantially parallel to a direction of the airflow, with one or more concentric disks spaced along the length of the mast and oriented substantially perpendicular to the direction of the airflow.

16. The system of claim 13, wherein the first electrode of each tubular element of the first array and the second array is operated with a negative polarity.

17. The system of claim 13, wherein the first electrode of each tubular element of the first array and the second array is operated with a positive polarity.

18. The system of claim 13, wherein the direction of airflow in the first array of tubular elements is substantially opposite to that of the airflow in the second array of tubular elements.

19. The system of claim 13, further comprising a generator coupled to the turbine and operating to generate electricity in response to operation of the turbine.

20. The system of claim 13, wherein an outer edge of each disk of the first electrode of the first array and of the second array is serrated with a plurality of notches distributed along a circumference of each disk.

21. The system of claim 13, further comprising a filter positioned to intercept the airflow prior to the airflow entering the first end of the first array of tubular elements.

22. The system of claim 13, further comprising a heat recovery steam generator operable to convert exhaust heat from the turbine into a source of steam.

23. The system of claim 22, further comprising a steam turbine operable to generate power from the source of steam produced by the heat recovery steam generator.

24. The system of claim 22, further comprising an absorption chiller operable to convert the source of steam into a cooling fluid, and further, wherein the cooling fluid is arranged to flow along or across the exterior of one or more of the tubular elements of the first array or the second array.

25. The system of claim 24, wherein the absorption chiller is positioned to receive as an input the cooling fluid after its flow along or across the exterior of one or more of the tubular elements and to output a cooled version of the input cooling fluid, the cooled version being arranged to flow along or across the exterior of one or more of the tubular elements.

* * * * *